United States Patent
Kaneko

(10) Patent No.: US 6,195,131 B1
(45) Date of Patent: Feb. 27, 2001

(54) METHOD OF GENERATING ENLARGED IMAGE SIGNAL BY THE USE OF FIELD MEMORY

(75) Inventor: Hiromasa Kaneko, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 0 days.

(21) Appl. No.: 09/186,550

(22) Filed: Nov. 5, 1998

(30) Foreign Application Priority Data

Nov. 7, 1997 (JP) .................................................. 9-322491

(51) Int. Cl.⁷ ...................................................... H04N 5/44
(52) U.S. Cl. .............................................. 348/561; 348/715
(58) Field of Search ..................................... 348/561, 562, 348/581, 582, 714, 718, 715; 345/127, 130, 131; H04N 5/44

(56) References Cited

U.S. PATENT DOCUMENTS 4,891,702 * 1/1990 Nakayama et al. .................. 348/561
5,396,298 * 3/1995 Hosokawa et al. .................. 348/581
5,781,244 * 7/1998 Hirose et al. ........................ 348/561
5,940,146 * 8/1999 Sakaguchi et al. .................. 348/561

\* cited by examiner

*Primary Examiner*—Michael Lee
(74) *Attorney, Agent, or Firm*—Koda & Androlia

(57) ABSTRACT

In a method of generating an enlarged image signal by the use of a field memory, an image signal enlargement processing cycle constituted by n-th to (n+5)-th fields is repeated so that each one field of image signals read in the order of the n-th to (n+5)-th is sequentially processed by a signal processing circuit into video image signals. The signals are supplied by interlaced scanning to a video image reproducer such as an external television or video projector so that an image is displayed on a display screen in the order of an odd-line field and an even-line field. An area to be enlarged is sequentially written into an odd-line block and an even-line block of a field memory and can continuously be moved on the basis of a designation signal from a microcomputer, so that an enlarged image can be scrolled on the display screen.

6 Claims, 8 Drawing Sheets

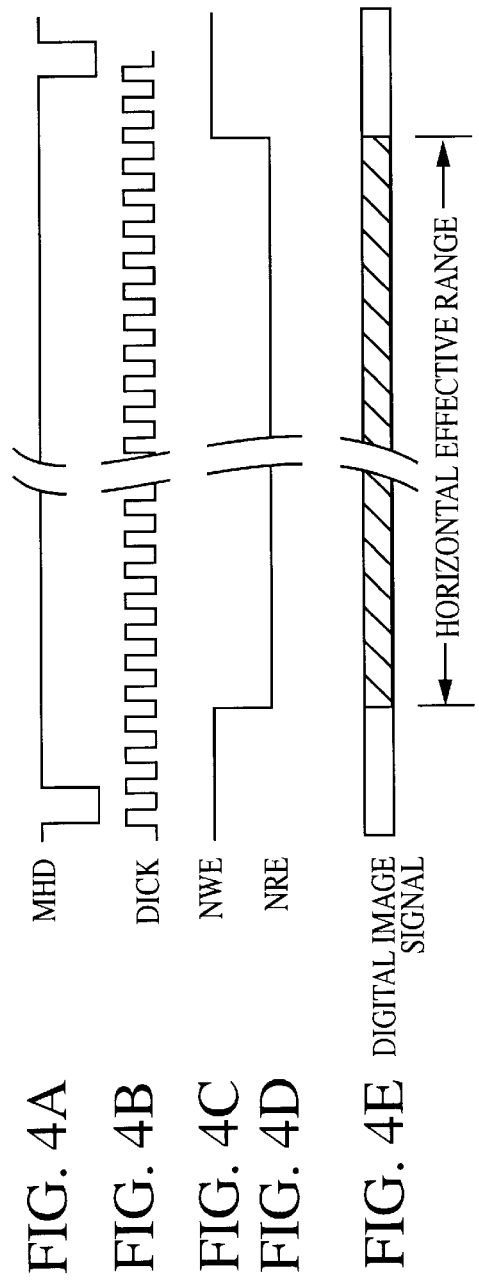

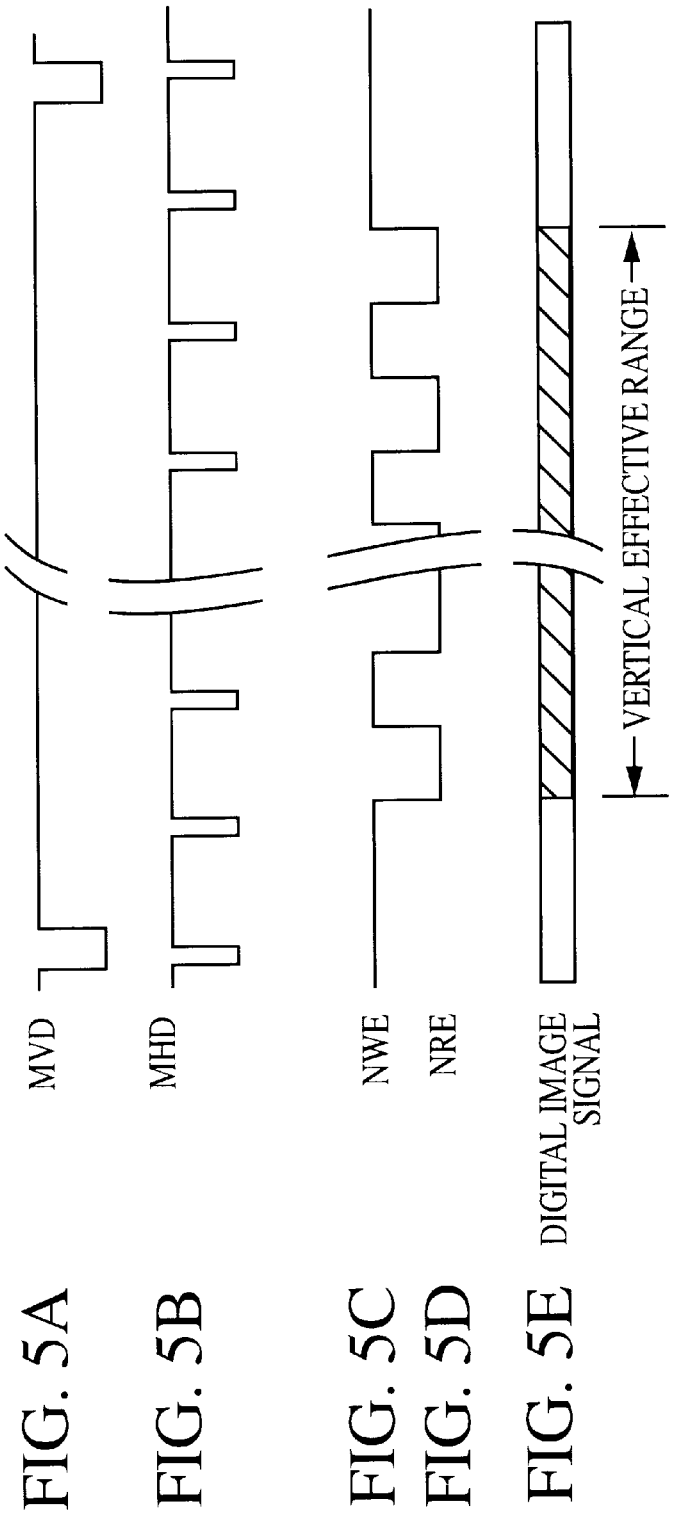

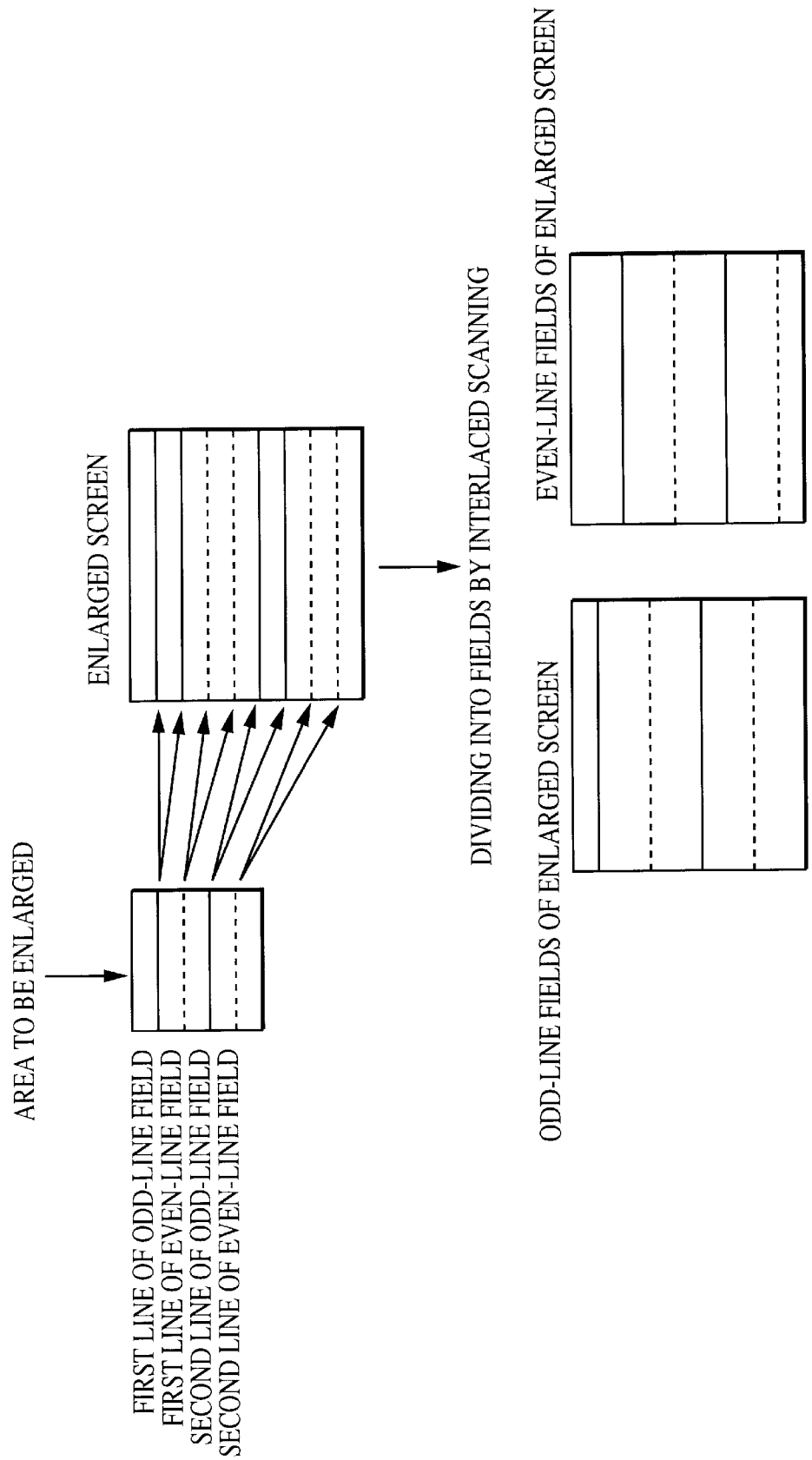

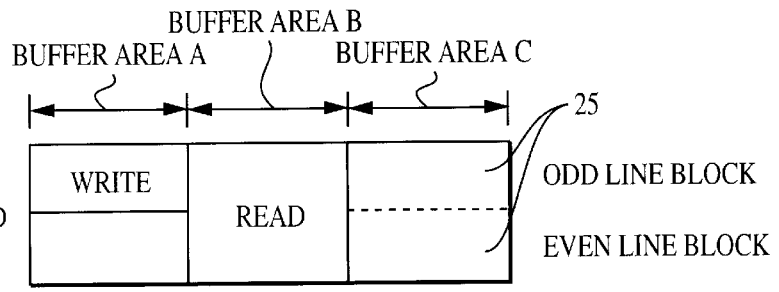
FIG. 9A N-TH FIELD
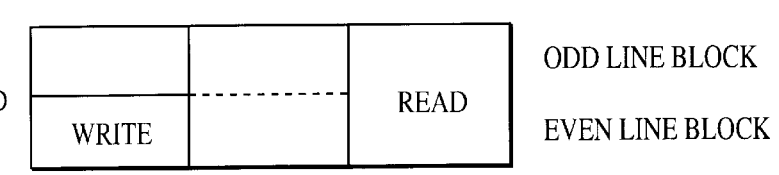
FIG. 9B (N+1)-TH FIELD
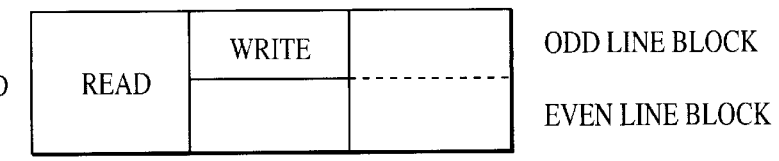
FIG. 9C (N+2)-TH FIELD
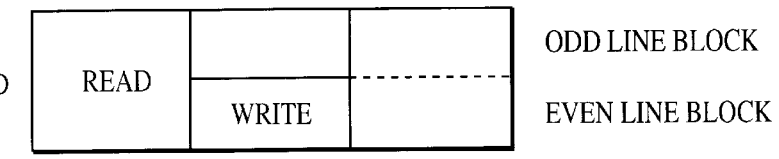
FIG. 9D (N+3)-TH FIELD
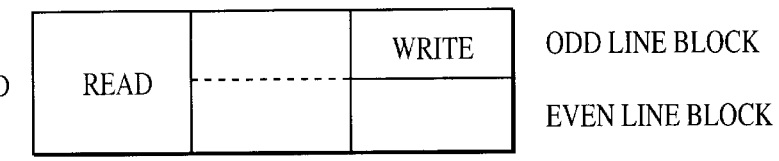
FIG. 9E (N+4)-TH FIELD
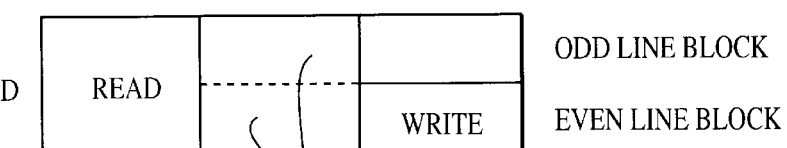
FIG. 9F (N+5)-TH FIELD

METHOD OF GENERATING ENLARGED IMAGE SIGNAL BY THE USE OF FIELD MEMORY

BACKGROUND OF THE INVENTION

1. Field of the Invention

This invention relates to a method of generating an enlarged image signal using a field memory.

2. Description of the Prior Art

A conventional process for electronically enlarging an image signal using a memory is executed as follows. First, image signals for one frame on an input screen are written into a memory. A desired area of the written image signal to be enlarged is designated and read. A process for enlarging the read image signal is executed and the processed image signal is delivered to a monitor so that a corresponding image is displayed.

A field memory simplifies the control since the number of control signals used is small. Accordingly, the field memory is used as the above-described memory in the image signal enlarging process. However, the use of the field memory reveals the following disadvantages. In the field memory, a write address serving as a write location and a read address serving as a read location are sequentially incremented from a start address by a write-in clock (WCLK) and a read-out clock (RCLK) respectively. The write address and the read address can be returned to the start address by respective reset signals. However, a writing operation and a reading operation following the write and read addresses respectively can be executed only by sequential addresses.

Accordingly, when the image signals of one frame written into the field memory is read out so that the image signal of an enlarged area is extracted, the image signal other than the enlarged area needs to be discharged at high speeds. Thus, it is not easy to extract only the image signal of the area to be enlarged during the processing of dynamic images.

SUMMARY OF THE INVENTION

Therefore, an object of the present invention is to provide a method of generating enlarged image signals using the field memory, which method can overcome the above-described problems and can render the image signal enlarging process easier.

The present invention provides an improved method of generating enlarged image signals in use of field memory. In the method, means is provided for designating an area to be enlarged in an image signal delivered from a video camera. A memory is provided for storing the image signal of the designated area to be enlarged. A memory controller is provided for controlling write and read of the image signal into and from the memory. Signal converting means is provided for converting the image signal read from the memory to a corresponding video image signal. Image display means is provided for displaying an image on a display screen on the basis of the video image signal. An odd-line field memory is provided into which image signals of odd-line fields by the interlaced scanning are written. An even-line field memory is provided into which image signals of even-line field by the interlaced scanning are written. The method comprises the steps of writing the image signals of the odd-line field and the image signals of the even-line field into predetermined buffer areas of the field memories respectively in a two-field period of an n-th field and an (n+1)-th field, and reading into predetermined buffer areas alternately the image signals of the odd-line and even-line fields corresponding to the two frames in a four-field period of following (n−4)-th to (n−1)-th fields, thereby generating image signals corresponding to one frame of an enlarged screen, writing the image signals of the odd-line field and the image signals of the even-line field into predetermined buffer areas of the field memory respectively in a two-field period of following (n+2)-th and (n+3)-th fields, and reading into predetermined buffer areas alternately the image signals of the odd-line and even-line fields corresponding to the two frames in the two-field period of the n-th and (n+1)-th fields, thereby generating image signals corresponding to one frame of the enlarged screen, and writing the image signals of the odd-line field and the image signals of the even-line field into predetermined buffer areas of the field memory respectively in a two-field period of (n+4)-th and (n+5)-th fields, and reading into predetermined buffer areas alternately the image signals of the odd-line and even-line fields corresponding to the two frames in the two-field period of the n-th and (n+1)-th fields, thereby generating image signals corresponding to one frame of the enlarged screen, the above-described steps being repeated.

According to the above-described method, the two field memories are used so that the image signals of the odd-line and even-line fields of previously designated areas to be enlarged are written into the respective field memories and buffered. The image signals are read from the start every one line to thereby be generated into enlarged image signals. This eliminates the image signal processing, for example, discharging at high speeds unnecessary image signals other than the area to be enlarged. Consequently, the process of enlarging the image signals by using the field memories can be rendered easier and storage capacities of the memories can be reduced. Furthermore, the above-described processing cycle for enlarging the image signals of the n-th to (n+5)-th fields is repeated so that a buffer structure suitable to the field memories can be composed and the image signal enlarging process can be executed with use of the memories of smaller storage capacities.

In the above-described method, the enlarged area designating means preferably designates a range of the image signals horizontally and vertically on the basis of horizontal and vertical synchronizing signals. Consequently, any area on the display screen can be designated as the area to be enlarged and accordingly, the image signal enlarging process can be rendered easier.

Furthermore, the enlarged area designated by the enlarged area designating means is sequentially changed. An enlarged image can be scrolled on the display screen. Additionally, the enlarged area designated by the enlarged area designating means is sequentially changed on the basis of the enlarged area designating signals delivered from a microcomputer. Consequently, the enlarged image can be scrolled quickly on the display screen.

BRIEF DESCRIPTION OF THE DRAWINGS

Other objects, features and advantages of the present invention will become clear upon reviewing the following description of the preferred embodiment, made with reference to the accompanying drawings, in which:

FIG. 3 shows the relationship between the image signal and the data clock signal DICK;

FIGS. 4A to 4E show the operation for determining a horizontal effective range of the image signal;

FIGS. 5A to 5E show the operation for determining a vertical effective range of the image signal;

FIG. 8 shows the manner for generating enlarged image signals; and

FIGS. 9A to 9F are timing charts showing the manner for generating the enlarged image signals.

DETAILED DESCRIPTION OF THE PREFERRED EMBODIMENT

Figure 1:
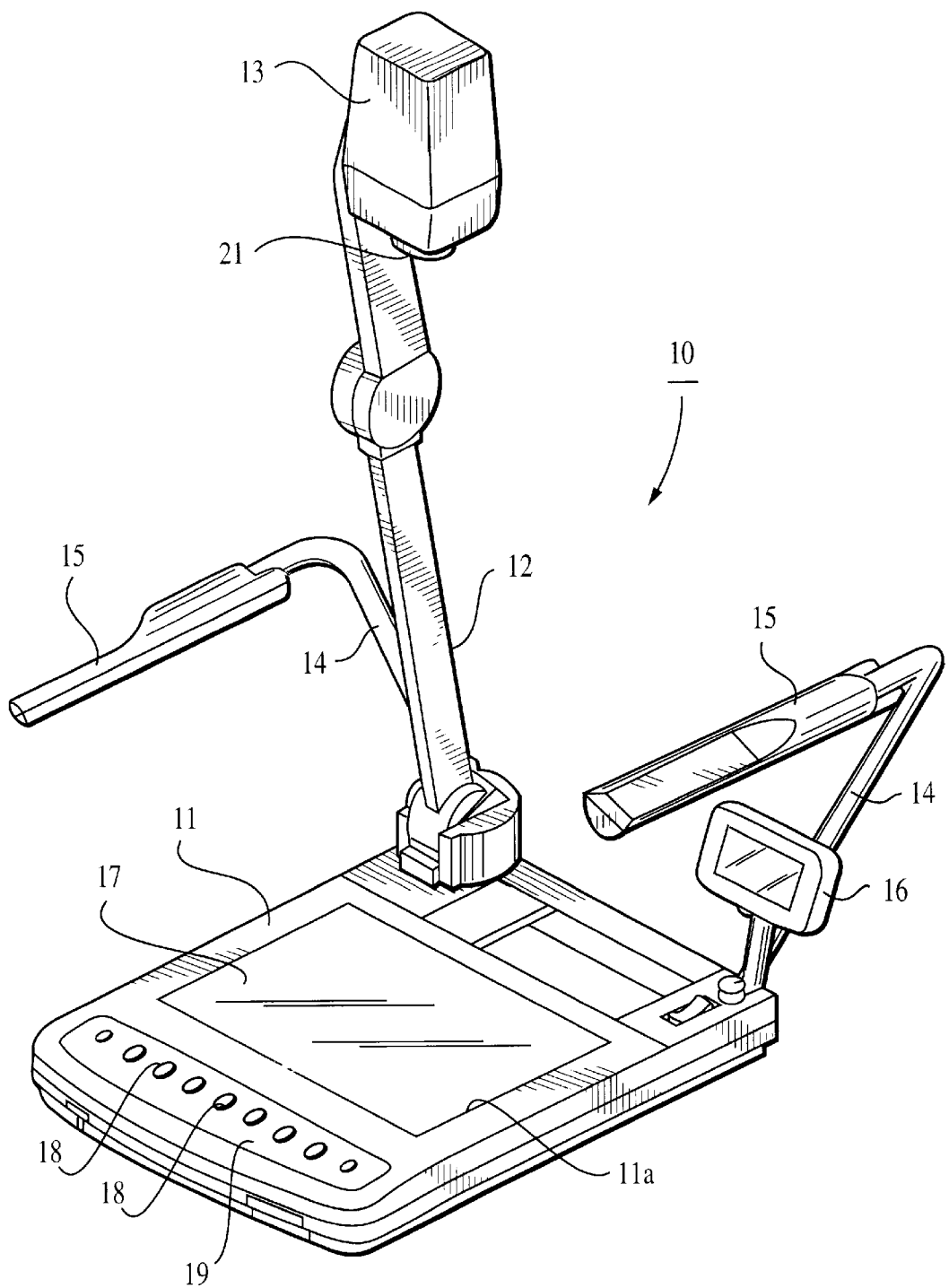
FIG. 1 is a perspective view of the material exhibiting apparatus carrying out the image signal enlarging method of one embodiment in accordance with the present invention.

One embodiment of the present invention will be described with reference to the accompanying drawings. Referring first to FIG. 1, a material exhibiting apparatus 10 carrying out the method of the invention is shown. The material exhibiting apparatus 10 comprises a stage 11 on which a material such as a manuscript or object is placed, a foldable column 12 standing at a rear corner of the stage 11, and a video camera 13 supported on the column 12 so as to be located over a central portion of the stage 11. A pair of arms 14 are mounted on both ends of a rear wall of the stage 11 respectively. Two illumination lamps 15 are mounted on distal ends of the arms 14 for illuminating the material placed on the stage 11 respectively. A monitor television 16 is mounted on a rear corner of the stage 11 opposite the column 12. The stage 11 has a central rectangular opening 11a which is covered with a milk-white semitransparent diffusion plate 17 made of an acrylic resin. Another illumination lamp (not shown) is provided in the stage 11 for illuminating the material on the stage 11 from below the material. An operation panel 19 including various operation switches 18 is mounted on a front of the stage 11.

Figure 2:
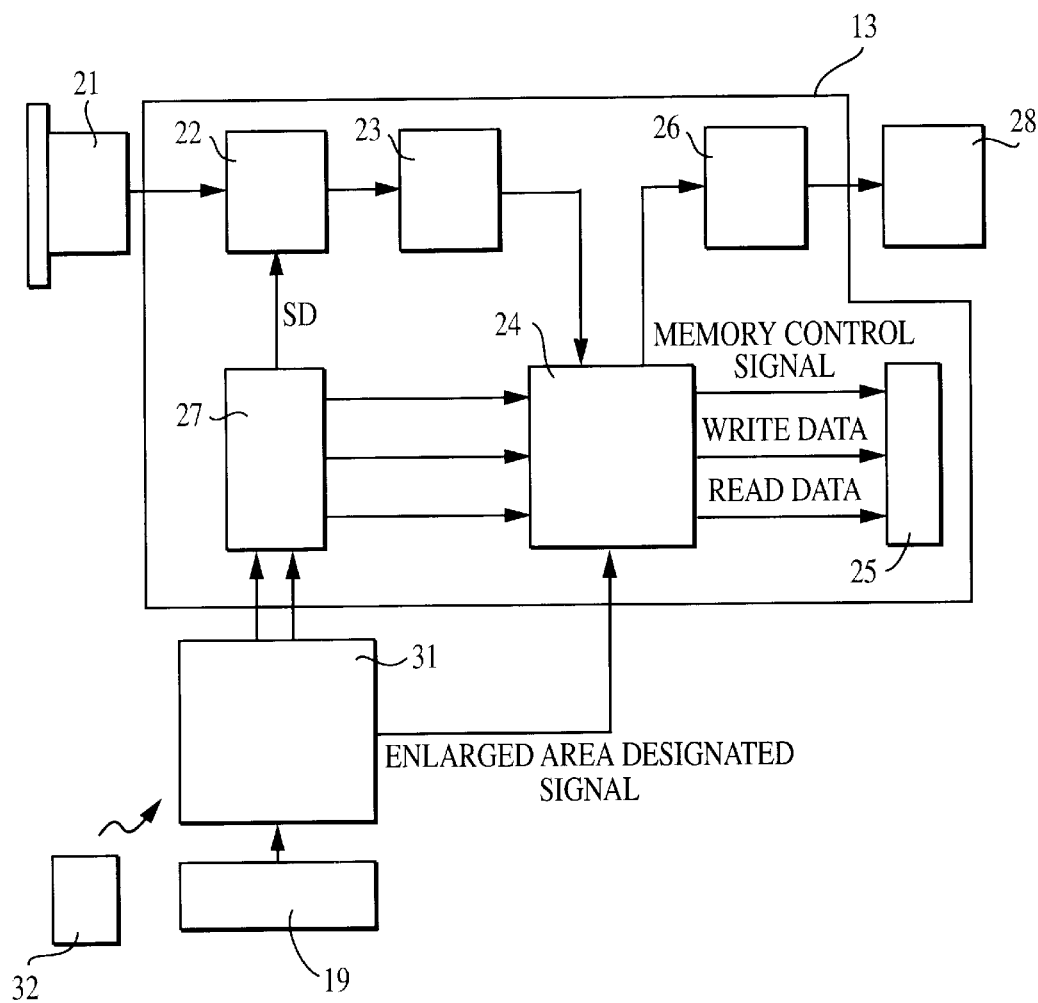
FIG. 2 is a schematic block diagram showing the electrical arrangement of the apparatus.

Referring now to FIG. 2, the video camera 13 includes a taking lens 21, a CCD image sensor 22, an A/D converter 23 for converting an analog photoelectric signal delivered from the CCD image sensor 22 to a corresponding digital signal, and a memory controller 24. The video camera 13 further includes a field memory 25 and a well known signal processing circuit 26 for converting digital image signals read via the memory controller 24 from the field memory 25 to corresponding video image signals. The video camera 13 further comprises a synchronizing signal generating circuit 27 delivering a image synchronizing signal SD to a driver of the CCD image sensor 22. The synchronizing signal generating circuit 27 further delivers data clock signals DICK, a horizontal synchronizing signal MHD and a vertical synchronizing signal MVD to the memory controller 24.

The digital image signal read from the field memory 25 is processed by the signal processing circuit 26 into a video image signal. The processed video image signal is delivered to a video image reproducing unit 28 such as an external television or video projector so that an image is displayed on a display screen. A microcomputer 31 comprises a CPU, various memories, an input-output interface, a counter and a counter register, none of which are shown. Based on signals from the operation switches 18 on the operation panel 19 and a remote controller 32, the microcomputer 31 delivers signals designating an area to be enlarged etc. according to a predetermined processing program, as will be described later.

The memory controller 24 controls write and read of digital image signals into and from the field memory 25. The digital image signals delivered from the A/D converter 23 are supplied into the memory controller 24 in synchronization with the data clock signal DICK on the basis of the vertical and horizontal synchronizing signals MVD and MHD. The digital image signals are also delivered from the memory controller 24 in synchronization with the data clock signal DICK on the basis of the vertical and horizontal synchronizing signals MVD and MHD. See FIG. 3. A count of the data clock signal DICK is obtained by the counting on the basis of the fall of the horizontal synchronizing signal MHD. The memory controller 24 then compares the count of the data clock signal DICK with start and end points of a horizontal effective range set by the microcomputer 31, thereby determining a horizontal effective range of the image signal. See FIGS. 4A to 4E. Regarding the vertical direction, a count of the horizontal synchronizing signal MHD is obtained on the basis of the vertical synchronizing signal MVD. The memory controller 24 compares the obtained count of the horizontal synchronizing signal MHD with start and end points of a vertical effective range set by the microcomputer 31, thereby determining a vertical effective range. See FIGS. 5A to 5E.

Figure 6:
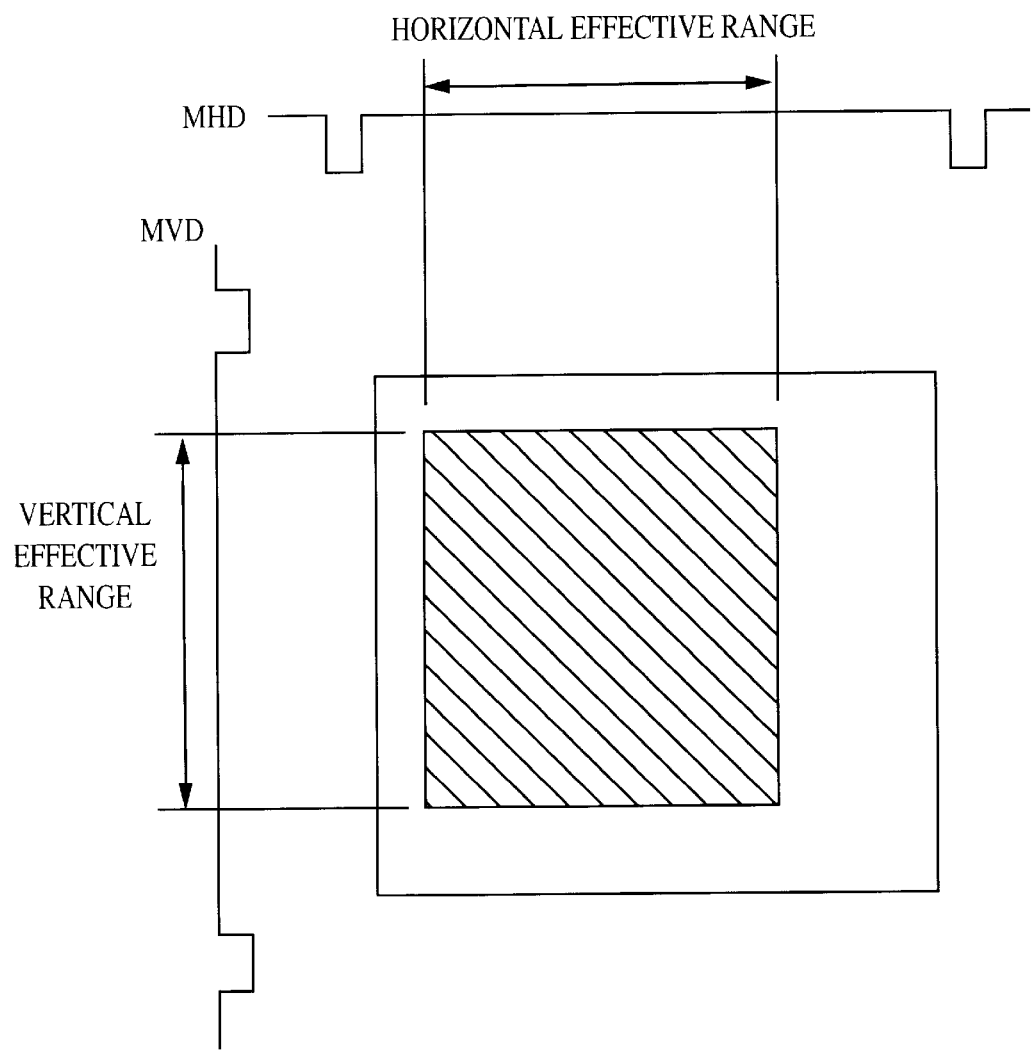
FIG. 6 shows the manner for designating an optional area as the area to be enlarged on the display screen.
Figure 7:
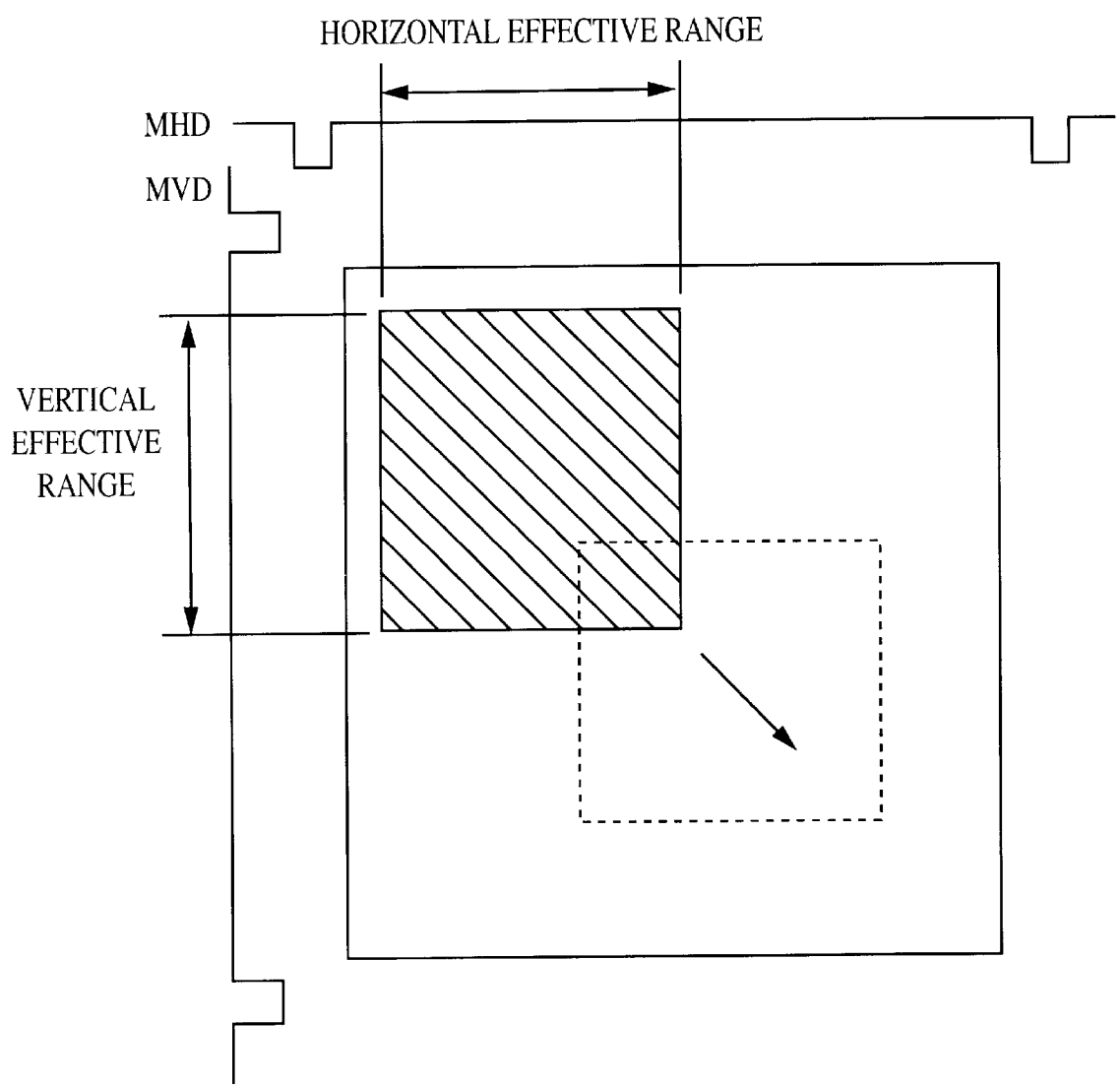
FIG. 7 shows the manner for changing the designation of the area to be enlarged.

Based on the determined horizontal and vertical effective ranges, a signal NWE representative of an effective write range and a signal NRE representative of an effective read range are generated so that the memory controller 24 controls write and read of the image signal only within the effective range. Thus, the range of the image signal is designated horizontally and vertically on the basis of the horizontal and vertical synchronizing signals MHD and MVD, whereby an optional area on the display screen can be designated as an area to be enlarged. See FIG. 6. Furthermore, the range to be enlarged can continuously be moved according to an area designation signal from the microcomputer 31, so that an enlarged image can be scrolled on the display screen, as shown in FIG. 7.

Regarding the image signal obtained by the video camera 13, one frame is constituted by two fields, namely, an odd-line field and an even-line field by an interlace scan. Furthermore, the odd-line field and the even-line field are lined alternately every other line for the interlaced scanning on the display screen. Accordingly, in order that an area to be enlarged which is one fourth of a display area may be doubled vertically, the odd-line and even-line fields are lined every third line. From the point of view of signals for the interlaced scanning, the odd-line and even-line fields are read every other line so that one field of an enlarged screen is generated. For the next one field, one frame is generated using the same field. Consequently, a screen doubled vertically and horizontally can be obtained. See FIG. 8.

If a previously written image signal is not read in a write period of one frame of the image signal, data becomes insufficient, for example, nothing is displayed on the display screen. In view of this, four fields (two frames) of image signals for the area to be enlarged is required so that an enlarged screen of two fields (one frame) is provided. The memory controller 24 controls write and read of the image signal into and from the field memory 25 so that an enlarged image signal is generated. This method will be described with reference to timing charts of FIGS. 9A to 9F. Two field memories 25 are used, one of which serves as an odd-line block dedicated to the odd-line field and the other of which serves as an even-line block dedicated to the even-line field. Each of the odd-line and even-line blocks is provided with three buffer areas A, B and C.

At an n-th field, an odd-line field of the image signal representative of the area to be enlarged is written into the buffer area A of the odd-line block. In the buffer area B, the memory controller 24 reads alternately every other line the image signal of the odd-line field written into the buffer area B of the odd-line block at an (n+2)-th field of the previous cycle and the image signal of the even-line field written into the buffer area B of the even-line block at an (n+3)-th field of the same previous cycle, thereby generating an enlarged image signal of one field. At the subsequent (n+1)-th field, the memory controller 24 writes an even-line field of the image signal of the area to be enlarged into the buffer area A of the odd-line block. In the buffer area C, the memory controller 24 reads alternately every other line the image signal of the odd-line field written into the buffer area C of the odd-line block at an (n+4)-th field of the previous cycle and the image signal of the even-line field written into the buffer area C of the even-line block at an (n+5)-th field of the same previous cycle, thereby generating an enlarged image signal of one field.

At an (n+2)-th field, the memory controller 24 reads alternately every other line the image signal of the odd-line field written into the buffer area A of the odd-line block at a the n-th field and the image signal of the even-line field written into the buffer area A of the even-line block at the (n+1)-th field, thereby generating an enlarged image signal of one field. The memory controller 24 then writes an odd-line field of the image signal representative of the area to be enlarged is written into the buffer area B of the odd-line block. At the (n+3)-th field, an enlarged image signal of one block is generated in the buffer area A in the same manner as at the (n+2)-th field. An even-line field of the image signal to be enlarged is written into the buffer area B of the even-line block.

At an (n+5)-th field, the memory controller 24 reads alternately every other line the image signal of the odd-line field written into the buffer area A of the odd-line block at the n-th field and the image signal of the even-line field written into the buffer area A of the even-line block at the (n+1)-th field, thereby generating an enlarged image signal of one field. The memory controller 24 then writes an odd-line field of the image signal of the area to be enlarged into the buffer area A of the odd-line block. At an (n+5)-th field, an enlarged image signal of one block is generated in the buffer area A in the same manner as at the (n+4)-th field. An even-line field of the image signal of the area to be enlarged is written into the buffer area C of the even-line block.

The above-described processing cycle for the image signal enlargement constituted by the n-th to (n+5)-th fields is repeated so that each one field of the enlarged image signal read in the order of the n-th to (n+5)-th fields is processed by the signal processing circuit 26 into a video image signal. The processed video image signals are supplied by the interlaced scanning to the video image reproducing unit 28 such as the external television or video projector to thereby be displayed on the display screen in the order of the odd-line field and the even-line field. The area to be enlarged, which is sequentially written into the odd-line and even-line blocks of the field-memory 25 is continuously moved by the designation signal from the microcomputer 31, so that the enlarged image is scrolled on the display screen.

According to the foregoing embodiment, the area to be enlarged is previously designated, and only the image signals of the designated area are written into the field memory 25. The buffer is arranged so as to be suitable for the field memory 25 permitting only the sequential access. Consequently, the memory capacity of the field memory can be reduced, and an overtaking phenomenon can be prevented. Moreover, the field memory having a memory capacity for one screen achieves the same effect as a double buffer with a video memory (VRAM). Consequently, the above-described field memory contributes to cost reduction. Furthermore, since the enlarged image is scrolled, the material exhibiting mode can be changed and accordingly, the product quality can be improved.

The foregoing description and drawings are merely illustrative of the principles of the present invention and are not to be interpreted in a limiting sense. Various changes and modifications will become apparent to those of ordinary skill in the art. All such changes and modifications are seen to fall within the scope of the invention as defined by the appended claims.

What is claimed is:

1. A method of generating enlarged image signals in use of field memory, wherein means is provided for designating a area to be enlarged in an image signal delivered from a video camera, a memory is provided for storing the image signal of the designated area to be enlarged, a memory controller is provided for controlling write and read of the image signal into and from the memory, signal converting means is provided for converting the image signal read from the memory to a corresponding video image signal, image display means is provided for displaying an image on a display screen on the basis of the video image signal, an odd-line field memory is provided into which image signals of odd-line fields by an interlace scan are written, and an even-line field memory is provided into which image signals of even-line field by the interlace scan are written, the method comprising the steps of:

writing the image signals of the odd-line field and the image signals of the even-line field into predetermined buffer areas of the field memories respectively in a two-field period of an n-th field and an (n+1)-th field, and reading into predetermined buffer areas alternately the image signals of the odd-line and even-line fields corresponding to the two frames in a four-field period of following (n−4)-th to (n−1)-th fields, thereby generating image signals corresponding to one frame of an enlarged screen;

writing the image signals of the odd-line field and the image signals of the even-line field into predetermined buffer areas of the field memories respectively in a two-field period of following (n+2)-th and (n+3)-th fields, and reading into predetermined buffer areas alternately the image signals of the odd-line and even-line fields corresponding to the two frames in the two-field period of the n-th and (n+1)-th fields, thereby generating image signals corresponding to one frame of the enlarged screen; and writing the image signals of the odd-line field and the image signals of the even-line field into predetermined buffer areas of the field memories respectively in a two-field period of (n+4)-th and (n+5)-th fields, and reading into predetermined buffer areas alternately the image signals of the odd-line and even-line fields corresponding to the two frames in the two-field period of the n-th and (n+1)-th fields, thereby generating image signals corresponding to one frame of the enlarged screen, the above-described steps being repeated.

2. The method according to claim 1, wherein the enlarged area designating means designates a range of the image signals by horizontal and vertical directions on the basis of horizontal and vertical synchronizing signals.

3. The method according to claim 1, wherein the enlarged area designated by the enlarged area designating means is sequentially changed.

4. The method according to claim 2, wherein the enlarged area designated by the enlarged area designating means is sequentially changed.

5. The method according to claim 2, wherein the enlarged area designated by the enlarged area designating means is sequentially changed on the basis of the enlarged area designating signals delivered from a microcomputer.

6. The method according to claim 3, wherein the enlarged area designated by the enlarged area designating means is sequentially changed on the basis of the enlarged area designating signals delivered from a microcomputer.

* * * * *